United States Patent
Baddepudi et al.

(10) Patent No.: US 11,095,714 B2
(45) Date of Patent: Aug. 17, 2021

(54) ORCHESTRATION OF DATA SERVICES IN MULTIPLE CLOUD INFRASTRUCTURES

(71) Applicant: YugaByte Inc, Sunnyvale, CA (US)

(72) Inventors: Bharat Chandra Baddepudi, Sunnyvale, CA (US); Bogdan-Alexandru Matican, Sunnyvale, CA (US); Ramkumar Vaidyanathan Sri, Sunnyvale, CA (US); Karthik Ranganathan, Sunnyvale, CA (US); Choudhury Sidharth, Sunnyvale, CA (US); Mikhail Andreyevich Bautin, Sunnyvale, CA (US); Kannan Muthukkaruppan, Sunnyvale, CA (US)

(73) Assignee: YugaByte Inc, Sunnyvale, CA (US)

( * ) Notice: Subject to any disclaimer, the term of this patent is extended or adjusted under 35 U.S.C. 154(b) by 61 days.

(21) Appl. No.: 16/398,279

(22) Filed: Apr. 30, 2019

(65) Prior Publication Data

US 2019/0342160 A1 Nov. 7, 2019

Related U.S. Application Data

(60) Provisional application No. 62/665,496, filed on May 1, 2018, provisional application No. 62/690,344, filed on Jun. 26, 2018.

(51) Int. Cl.
*H04L 12/24* (2006.01)
*H04L 29/08* (2006.01)
(Continued)

(52) U.S. Cl.
CPC ........ *H04L 67/1051* (2013.01); *G06F 9/5077* (2013.01); *G06F 16/27* (2019.01);
(Continued)

(58) Field of Classification Search
CPC ............. H04L 67/1051; H04L 41/0806; H04L 41/0893; H04L 41/22; H04L 61/1511;
(Continued)

(56) References Cited

U.S. PATENT DOCUMENTS

2010/0042720 A1* 2/2010 Stienhans ............. G06F 9/5072
709/226
2013/0346540 A1* 12/2013 Dean .................... H04L 67/1097
709/214
(Continued)

*Primary Examiner* — Abdulkader M Alriyashi
(74) *Attorney, Agent, or Firm* — IPHORIZONS PLLC; Narendra Reddy Thappeta

(57) ABSTRACT

Orchestration of data services in multiple cloud infrastructures using the same user interface. In an embodiment, a customer provisions a first data service on a first cloud infrastructure and then a second data service on a second cloud infrastructure, while using the same user interface. An orchestration server may receive a respective count of nodes ("universe") desired for each data service and issue commands to the corresponding cloud infrastructure to cause the desired data service to be provisioned. Another aspect facilitates creation/provisioning of a data service spanning multiple cloud infrastructures. In an embodiment, an orchestration server receives as inputs, the set of cloud infrastructures and count of nodes ("universe") desired for the data service, and thereafter issues commands to provisioning systems of the respective cloud infrastructures to cause the desired data service to be created/provisioned.

19 Claims, 16 Drawing Sheets

(51) Int. Cl.
*G06F 16/27* (2019.01)
*H04L 29/12* (2006.01)
*G06F 9/50* (2006.01)

(52) U.S. Cl.
CPC ...... *H04L 41/0806* (2013.01); *H04L 41/0893* (2013.01); *H04L 41/22* (2013.01); *H04L 61/1511* (2013.01); *H04L 67/10* (2013.01); *H04L 67/1097* (2013.01); *H04L 67/32* (2013.01); *H04L 67/34* (2013.01); *H04L 41/5096* (2013.01)

(58) Field of Classification Search
CPC ..... H04L 67/10; H04L 67/1097; H04L 67/32; H04L 67/34; G06F 16/27; G06F 9/5077
See application file for complete search history.

(56) References Cited

U.S. PATENT DOCUMENTS

| | | | |
|---|---|---|---|
| 2014/0280848 A1* | 9/2014 | Modh | H04L 67/10 709/223 |
| 2017/0006119 A1* | 1/2017 | Pogrebinsky | G06F 8/71 |
| 2018/0123904 A1* | 5/2018 | Thakrar | H04L 67/1002 |

* cited by examiner

510 — bin/ybcloud.sh gcp --region us-west1 --zone us-west1-b instance provision --instance_type n1-standard-1 --cloud_subnet subnet-us-west1 --assign_public_ip --vars_file /opt/yugabyte/data/keys/109e95b5-bf08-4a8f-a7fb-2d2866865e15/yb-gcp-config-key.vault --vault_password_file /opt/yugabyte/data/keys/109e95b5-bf08-4a8f-a7fb-2d2866865e15/yb-gcp-config-key.vault_password --private_key_file /opt/yugabyte/data/keys/109e95b5-bf08-4a8f-a7fb-2d2866865e15/yb-gcp-configkey.pem --num_volumes 2 --volume_size 250 --local_package_path /opt/third-party yb-15-xdc-read-replicas-n5

520 — bin/ybcloud.sh gcp --region us-west1 --zone us-west1-b instance configure --master_addresses_for_tserver 10.150.0.36:7100,10.150.0.42:7100,10.150.0.37:7100 --master_addresses_for_master 10.150.0.36:7100,10.150.0.42:7100,10.150.0.37:7100 --package /opt/yugabyte/releases/0.9.11.0-b19/yugabyte-ee-0.9.11.0-b19-centos-x86_64.tar.gz --extra_gflags {"placement_uuid":"f41ea79b-4a43-463a-8c47-f06e7692cf92","cluster_uuid":"03895b3e-8c9d-486faa89-8b2995c5fb63","metric_node_name":"yb-15-read-replica-demo-n3"} --vars_file /opt/yugabyte/data/keys/109e95b5-bf08-4a8f-a7fb-2d2866865e15/yb-gcp-config-key.vault --vault_password_file /opt/yugabyte/data/keys/109e95b5-bf08-4a8f-a7fb-2d2866865e15/yb-gcp-config-key.vault_password --private_key_file /opt/yugabyte/data/keys/109e95b5-bf08-4a8f-a7fb-2d2866865e15/yb-gcp-configkey.pem --num_volumes 2 --volume_size 250 yb-15-xdc-replica-replicas-n3

530 — bin/ybcloud.sh gcp --region us-west1 --zone us-west1-b instance control master start --vars_file /opt/yugabyte/data/keys/109e95b5-bf08-4a8f-a7fb-2d2866865e15/yb-gcp-config-key.vault --vault_password_file /opt/yugabyte/data/keys/109e95b5-bf08-4a8f-a7fb-2d2866865e15/yb-gcp-configkey.vault_password --private_key.pem /opt/yugabyte/data/keys/109e95b5-bf08-4a8f-a7fb-2d2866865e15/yb-gcp-config-key.pem yb-15-xdc-read-replicas-n3

540 — bin/ybcloud.sh gcp --region us-west1 --zone us-west1-b instance control tserver start --vars_file /opt/yugabyte/data/keys/109e95b5-bf08-4a8f-a7fb-2d2866865e15/yb-gcp-config-key.vault --vault_password_file /opt/yugabyte/data/keys/109e95b5-bf08-4a8f-a7fb-2d2866865e15/yb-gcp-configkey.vault_password --private_key.pem /opt/yugabyte/data/keys/109e95b5-bf08-4a8f-a7fb-2d2866865e15/yb-gcp-config-key.pem yb-15-xdc-read-replicas-n3

*FIG. 5A*

570: bin/ybcloud.sh aws --region us-east-1 --zone us-east-1a instance provision --instance_type c4.xlarge --cloud_subnet subnet-43b5bf0b --assign_public_ip --vars_file /opt/yugabyte/data/keys/c1472f5e-2a73-4ed1-ba16-c1fdf8e7f5ba/yb-amazon-new-key.vault --vault_password_file /opt/yugabyte/data/keys/c1472f5e-2a73-4ed1-ba16-c1fdf8e7f5ba/yb-amazon-new-key.vault_password --private_key_file /opt/yugabyte/data/keys/c1472f5e-2a73-4ed1-ba16-c1fdf8e7f5ba/yb-amazon-new-key.pem --key_pair_name yb-amazon-new-key --security_group yb-us-east-1-sg --num_volumes 2 --volume_size 250 --volume_type gp2 --local_package_path /opt/third-party yb-15-xdc-read-replicas-n1

580: bin/ybcloud.sh aws --region us-east-1 --zone us-east-1a instance configure --master_addresses_for_tserver 10.150.0.36:7100,10.150.0.42:7100,10.150.0.37:7100 --master_addresses_for_master 10.150.0.36:7100,10.150.0.42:7100,10.150.0.37:7100 --package /opt/yugabyte/releases/0.9.11.0-b19/yugabyte-ee-0.9.11.0-b19-centos-x86_64.tar.gz --extra_gflags {"placement_uuid":"da0d23b3-9f29-404b-8ab8-c944d5180a95","metric_node_name":"yb-15-readreplica-demo-n1"} --vars_file /opt/yugabyte/data/keys/c1472f5e-2a73-4ed1-ba16-c1fdf8e7f5ba/ybamazon-new-key.vault --vault_password_file /opt/yugabyte/data/keys/c1472f5e-2a73-4ed1-ba16-c1fdf8e7f5ba/yb-amazon-new-key.vault_password --private_key_file /opt/yugabyte/data/keys/c1472f5e2a73-4ed1-ba16-c1fdf8e7f5ba/yb-amazon-new-key.pem --num_volumes 2 --volume_size 250 yb-15-xdc-read-replicas-n1

*FIG. 5B*

FIG. 6B xdc-read-replicas  ⊙ Ready

Overview | Tables | Nodes | Metrics | Tasks | Backups

Run Sample Apps | Edit | More ▽ demo@yugabyte.com

Primary Cluster

Connect

| NAME | CLOUD | REGION | ZONE | MASTER | TSERVER | PRIVATE IP | STATUS | ACTION |
|---|---|---|---|---|---|---|---|---|
| Yb-15-xdc-read-replicas-n5 | gcp | us-west1 | us-west1-a | ⊙ Details | ⊙ Details | 10.150.0.36 | Live | ACTIONS ▽ |
| Yb-15-xdc-read-replicas-n4 | gcp | us-west1 | us-west1-c | ⊙ Details (Leader) | ⊙ Details | 10.150.0.42 | Live | ACTIONS ▽ |
| Yb-15-xdc-read-replicas-n6 | gcp | us-west1 | us-west1-b | ⊙ Details | ⊙ Details | 10.150.0.37 | Live | ACTIONS ▽ |

Read Replicas

Connect

<u>640</u>

| NAME | CLOUD | REGION | ZONE | MASTER | TSERVER | PRIVATE IP | STATUS | ACTION |
|---|---|---|---|---|---|---|---|---|
| Yb-15-xdc-read-replicas-n2 | aws | us-east-1 | us-east-1b | - | ⊙ Details | 172.152.40.119 | Live | ACTIONS ▽ |
| Yb-15-xdc-read-replicas-n3 | aws | us-east-1 | us-east-1f | - | ⊙ Details | 172.152.107.99 | Live | ACTIONS ▽ |
| Yb-15-xdc-read-replicas-n1 | aws | us-east-1 | us-east-1e | - | ⊙ Details | 172.152.82.148 | Live | ACTIONS ▽ |

Cloud Providers
Select All None
☑ GCP-Config

ORCHESTRATION OF DATA SERVICES IN MULTIPLE CLOUD INFRASTRUCTURES

PRIORITY CLAIM

The present disclosure claims priority to U.S. Provisional Patent Application No. 62/665,496, filed May 1, 2018, entitled "ORCHESTRATION OF DISTRIBUTED DATABASES SPANNING DIVERSE CLOUD INFRASTRUCTURES," and U.S. Provisional Patent Application No. 62/690,344, filed Jun. 26, 2018, entitled "ORCHESTRATION OF DISTRIBUTED DATABASES SPANNING DIVERSE CLOUD INFRASTRUCTURES," both of which are incorporated herein by reference in their entireties.

RELATED APPLICATIONS

The present application is related to the following co-pending applications, which are both incorporated in their entirety into the present application:
1. Entitled, "SELECTION OF LEADER NODES IN DISTRIBUTED DATA SERVICES", Ser. No.: 16/398,281, Filed on Apr. 30, 2019 (now issued as U.S. Pat. No. 10,749,951).
2. Entitled, "CONSUMPTION OF DATA SERVICES PROVISIONED IN CLOUD INFRASTRUCTURES", Ser. No.: 16/398,283, Filed on Apr. 30, 2019.

BACKGROUND OF THE DISCLOSURE

Technical Field

The present disclosure relates to cloud computing and more specifically to orchestration of data services in multiple cloud infrastructures.

Related Art

Cloud infrastructure refers to a collection of processing nodes, connectivity infrastructure, data storages, etc., which are engineered to together provide a virtual computing infrastructure for various customers, with the scale of such computing infrastructure being specified often on demand Many vendors such as Amazon, Google, Microsoft, etc., provide corresponding public cloud infrastructures that span multiple continents currently.

Data services are often provided based on cloud infrastructures. A data service is designed to provide access to data stored in data storages, and is commonly implemented as a collection of processing nodes and data storage nodes. The collection of such nodes is referred to as a 'universe' of nodes providing the corresponding data service. Thus each data service may be viewed as being provided by a corresponding universe of nodes.

In the context of cloud infrastructures, software applications executing in the nodes of cloud infrastructure may receive desired data elements by interacting with the data service according to pre-specified conventions. Data services are referred to as 'data as a service' (DaaS) in several environments.

Orchestration of a data service may entail creation or formation of the universe for hosting the data service, any preparatory steps thereto (checking node availability, etc.), configuration of the nodes in the universe to provide the data service, and/or subsequent administrative tasks. Examples of such administrative tasks include expanding/shrinking the size of the universe, replacing nodes of the universe on demand (i.e., migrating application/data to another node), increasing replication factor, taking backups, restoring from a backup, changing the node type, upgrading/downgrading the data service implementation, performing rolling software upgrade, etc.

Aspects of the present disclosure relate to orchestration of data services in multiple cloud infrastructures.

BRIEF DESCRIPTION OF THE DRAWINGS

Example embodiments of the present disclosure will be described with reference to the accompanying drawings briefly described below.

FIGS. 4A-4D depicts sample user interfaces provided for creation of a distributed database (example data service) in one embodiment.

FIGS. 5A and 5B depict example commands issued for creation of a distribution database (example data service) in one embodiment.

FIGS. 6A-6E depicts sample user interfaces provided for monitoring the details of a provisioned distributed database (example data service) in one embodiment.

In the drawings, similar reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1:
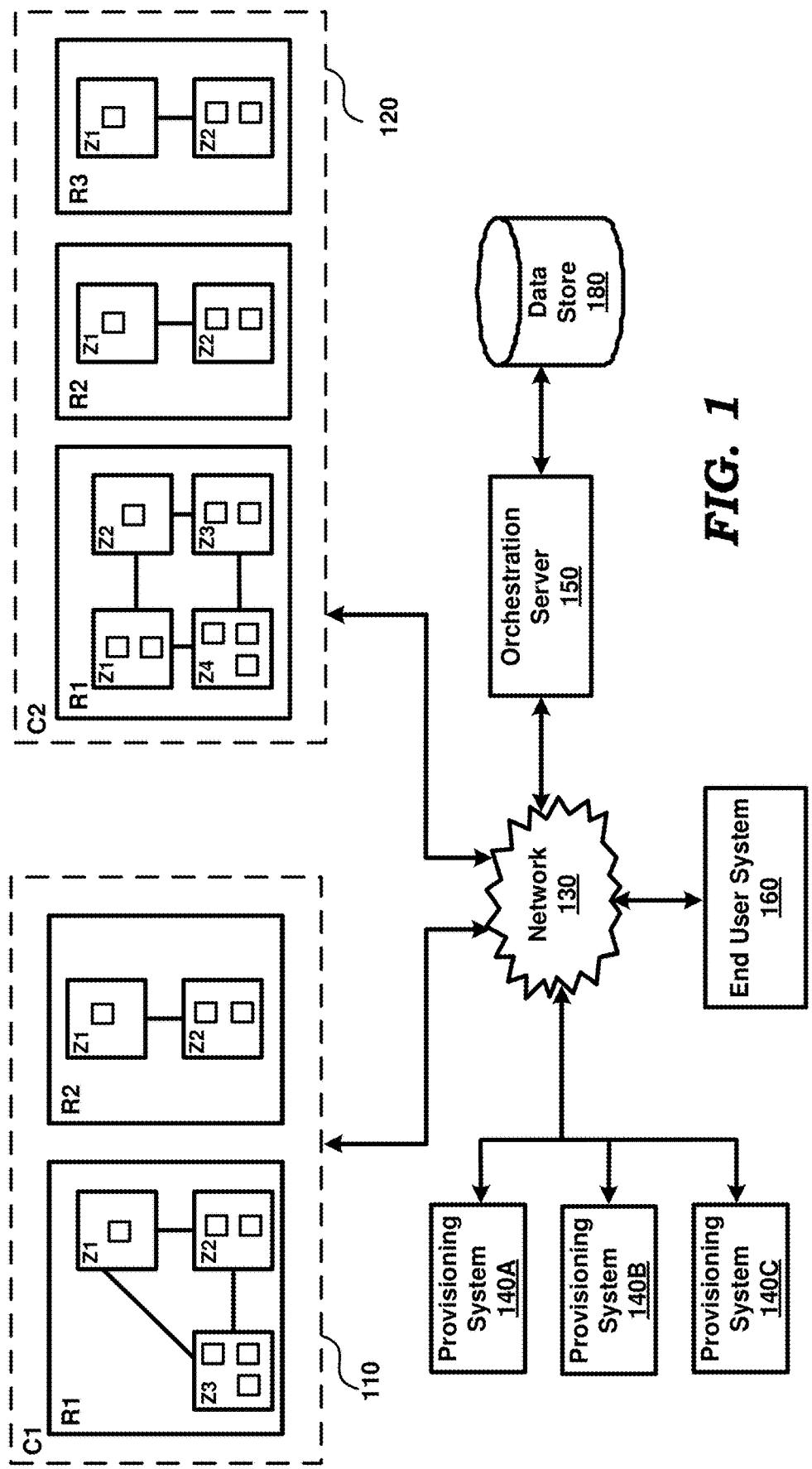
FIG. 1 is a block diagram illustrating an example environment in which several aspects of the present disclosure can be implemented.

An aspect of the present disclosure provides for orchestration of data services in multiple cloud infrastructures using the same user interface. In an embodiment, a user can provision/create a first data service on a first cloud infrastructure and thereafter provision/create a second data service on a second cloud infrastructure, while using the same user interface for creating both the data services. An orchestration server may receive a respective count of nodes desired for each data service and issue commands to the corresponding cloud infrastructure to cause the desired data service to be provisioned with the specified count of nodes. Due to the use of the same user interface for creation/provisioning of data services in different cloud infrastructures, the customer creating such data services is shielded from the complexities and details of the internal interfaces of the cloud infrastructures.

Another aspect of the present disclosure provides for creation of a data service spanning multiple cloud infrastructures. In an embodiment, an orchestration server receives as inputs (from a customer) via a common user interface, the set of cloud infrastructures and count of nodes desired for the data service, and thereafter issues commands to provisioning systems of the respective cloud infrastructures to cause the desired data service to be created/provisioned with the specified count of nodes. The customer may accordingly be shielded from the complexities and details of the underlying cloud infrastructures.

In one embodiment, the orchestration server also issues additional commands directly to the nodes provisioned in each of the set of cloud infrastructures to install software components on each node such that the nodes operate to provide the desired data service.

According to one more aspect of the present disclosure, the respective nodes provisioned in the set of cloud infrastructures by an orchestration server operate together as a distributed database. In one embodiment, the provisioned nodes form a primary cluster of the distributed database, with the orchestration server providing the ability (to the customer), via the common user interface noted above, to provision another set of nodes across multiple cloud infrastructures that form a read replica for the distributed database.

According to yet another aspect of the present disclosure, an orchestration server receives only an intent of an orchestration task to be performed with respect to the set of provisioned nodes ("universe"), and then performs various underlying tasks (e.g. issuing commands to the nodes) associated with the intent without requiring the customer to either specify or be aware of the underlying tasks. Examples of intents include but are not limited to creation of the data service, expanding the universe by adding additional nodes, shrinking the universe by removing provisioned nodes, changing the node type, update of software components deployed on the nodes, performing rolling software upgrade, migration of software components and data from one node to another node.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example environment (computing system) in which several aspects of the present disclosure can be implemented. The block diagram is shown containing cloud infrastructures 110 and 120, network 130, provisioning systems 140A-140C, orchestration server 150, end user system 160 and data store 180.

Merely for illustration, only representative number/type of blocks is shown in the FIG. 1. Many environments often contain many more blocks, both in number and type, depending on the purpose for which the environment is designed. Each block of FIG. 1 is described below in further detail.

Cloud infrastructure (C1) 110 is shown containing nodes (processing or storage, shown as squares) located in two different geographical regions R1 and R2. Each region is shown containing multiple availability zones (named as Z1, Z2, etc.), each having independent support infrastructure such as power, networking, etc. Each availability zone (e.g., C1-R1-Z1) can thus operate independent of other zones, such that the availability zone can continue to operate even upon the failure of the other zones (e.g., C1-R1-Z2 and C1-R1-Z3). The nodes can be virtual nodes (e.g., virtual machines (VMs), containers containing one or more VMs) operating based on physical nodes, physical nodes themselves, or a combination as well.

Cloud infrastructure (C2) 120 is similarly shown with regions R1, R3, R4 with respective regional sets of availability zones, with each availability zone containing respective nodes. It may be appreciated that the cloud infrastructures span several continents and are provided by different vendors. In addition, each cloud infrastructure may vary substantially from another in terms of interface requirements, scale, technical characters of nodes, hardware/software/network implementation, etc., and thus the cloud infrastructures are said to be diverse. Examples of such diverse cloud infrastructures include, but are not limited to, public clouds such as Amazon Web Services (AWS) Cloud available from Amazon.com, Inc., Google Cloud Platform (GCP) available from Google LLC, etc., and private clouds such as On-Premises clouds owned by the customers.

Network 130 represents a network providing connectivity between cloud infrastructures 110 and 120, provisioning systems 140A-140C, orchestration server 150 and end user system 160. Network 110 may be an internetwork (including the world-wide connected Internet), an intranet, a combination of internetwork and intranet, etc. Network 110 may be implemented using protocols such as Transmission Control Protocol (TCP) and/or Internet Protocol (IP), well known in the relevant arts. In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by network 110. When the packet contains content such as port numbers, which specifies a target application, the packet may be said to be directed to such application as well.

Each of the provisioning systems 140A-140C is designed to control configuration of nodes within a corresponding cloud infrastructure. Thus, provisioning systems 140A and 140B may respectively be for controlling cloud infrastructures 110 and 120, and be provided by vendors of the respective cloud infrastructures. Provisioning system 140C represents a similar system, but provided by third party vendors (who do not provide the cloud infrastructure themselves). Thus provisioning system 140C may communicate directly with the corresponding cloud infrastructure (say 120) or interface with the vendor provided provisioning system (140B) to cause the corresponding configuration. Communication directly implies that the corresponding instruction is encoded in IP packets directed to (the nodes of) the cloud infrastructure. Examples of third party provisioning systems include, but are not limited to, Ansible available from Red Hat Inc, TerraForm available from HashiCorp, Inc, etc.

Data store 180 represents a non-volatile (persistent) storage facilitating storage and retrieval of data (details of nodes, orchestration, etc.) by applications executing in orchestration server 150. Data store 180 may be implemented as a corresponding database server using relational database technologies and accordingly provide storage and retrieval of data using structured queries such as SQL (Structured Query Language). Alternatively, data store 180 may be implemented as a corresponding file server providing storage and retrieval of data in the form of files organized as one or more directories, as is well known in the relevant arts.

End user system 160 represents a system such as a personal computer, workstation, mobile device, computing tablet etc., used by users/customers to generate (user) requests directed to applications executing in orchestration server 150. The user requests may be generated using appropriate user interfaces (e.g., web pages provided by an application executing in the server, a native user interface provided by a portion of an application downloaded from the server, etc.). In general, end user system requests an application for performing desired tasks and receives the corresponding responses (e.g., web pages) containing the results of performance of the requested tasks. The web pages/responses may then be presented to the user/customer at end user system 160 by client applications such as the browser.

Orchestration server 150 represents a server system, such as a web/application server, executing applications designed to perform tasks requested by users/customers using end user system 160. Specifically, orchestration server 150 facilitates users/customers to perform orchestration of data services in multiple cloud infrastructures (such as 110 and 120) according to several aspects of the present disclosure as described below with examples.

3. Orchestration of a Data Service in Multiple Cloud Infrastructures

Figure 2:
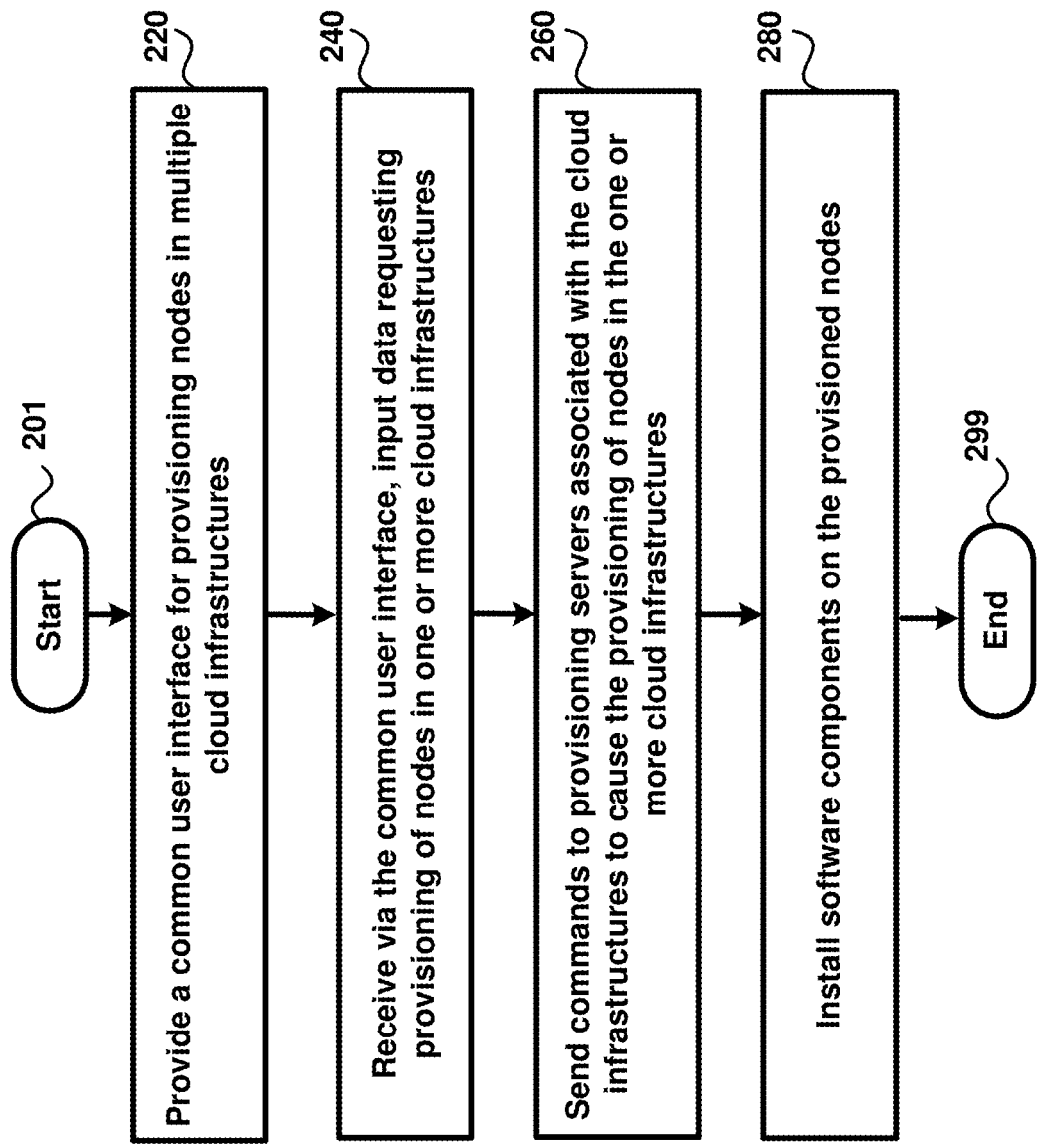
FIG. 2 is a flowchart illustrating the manner in which orchestration of data services in multiple cloud infrastructures is facilitated according to an aspect of the present disclosure.

FIG. 2 is a flowchart illustrating the manner in which orchestration of data services in multiple cloud infrastructures is facilitated according to an aspect of the present disclosure. The flowchart is described with respect to the systems of FIG. 1, in particular orchestration server 150, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 220.

In step 220, orchestration server 150 provides a common user interface for provisioning nodes (forming a universe) in multiple cloud infrastructures (such as 110 and 120). The universe of nodes may be provisioned for providing a desired data service. A common user interface implies that the same electronic form (containing the same fields, interface elements, etc., defined according to a layout) is presented to the users/customers for provisioning nodes on such multiple cloud infrastructures. The common user interface may be displayed to a user/customer using end user system 160.

In step 240, orchestration server 150 receives via the common user interface, input data requesting provisioning of nodes in one or more cloud infrastructures. The input data may be provided by the user/customer using end user system 160. The input data may specify the number of nodes forming the universe and the specific one or more cloud infrastructures in which the nodes are to be provisioned.

In one aspect, the user/customer first specifies a first input data for provisioning of a first data service in nodes of a first cloud infrastructure, followed by a second input data for provisioning of a second data service using the same common user interface. In another aspect, the user/customer specifies an input data indicating a set of infrastructures and a total number of nodes to be provisioned.

In step 260, orchestration server 150 sends commands to provisioning servers (such as 140A-140C) associated with the cloud infrastructures to cause the provisioning of nodes in the one or more cloud infrastructures (as specified by the input data). The specific commands sent to each provisioning server may be consistent with the syntax/semantics understood by the provisioning server. Upon receipt of the commands, each provisioning server operates to provision the requested number of nodes in the corresponding cloud infrastructure.

In step 280, orchestration server 150 installs any software components required on the respective provisioned nodes to cause the nodes to thereafter operate as a corresponding providing the desired data service. The flowchart ends in step 299.

Thus, orchestration server 150 facilitates a user/customer to provision a data service in multiple cloud infrastructures. It may be appreciated that by having the common user interface, the user/customer creating such data services is shielded from the complexities and details of the internal interfaces of the cloud infrastructures.

The manner in which orchestration server 150 facilitates the orchestration of an example data service in multiple cloud infrastructures according to the operation of FIG. 2 is illustrated below with examples.

4. Example Data Service

In the following sections, several aspects of the present disclosure are illustrated with respect to a distributed database as an example of a data service. However the features of the present disclosure may be implemented with respect to other data services (e.g., file server, replicated databases) as well, as will be apparent to one skilled in the relevant arts by reading the disclosure herein.

A distributed database is often implemented based on multiple nodes that cooperatively provide a unified view of database interfaces, while shielding the users from the underlying storage and processing of data. Distributed databases thus provide for fault tolerance (of nodes or storage), enhanced performance, data redundancy (by a replication factor), etc., as is well known in the relevant arts.

Figure 3:
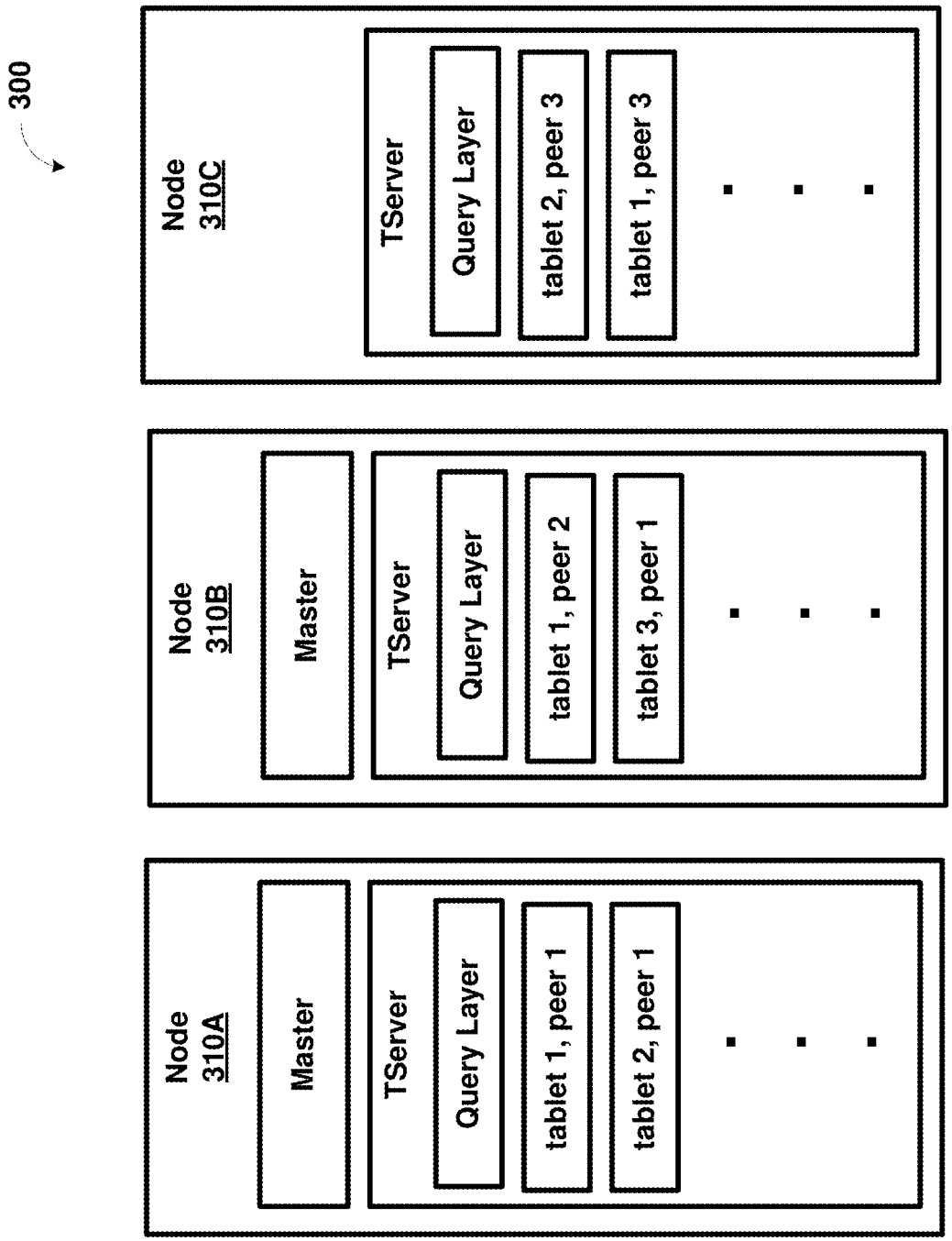
FIG. 3 depicts the internal details of a distributed database (example data service) in one embodiment.

FIG. 3 depicts the internal details of a distributed database (example data service) in one embodiment. Distributed database 300 is a group of nodes such as VMs, physical machines or containers (referred to as a "universe") that collectively function as a highly available and resilient distributed database. For illustration, the universe of distributed database 300 is shown containing three nodes 310A-310C, though in alternative embodiments, distributed databases contain fewer or more nodes depending on the purpose for which the database is designed.

Distributed database 300 is a system-of-record/authoritative database that geo-distributed applications can rely on for correctness and availability. Distributed database 300 allows applications to easily scale up and scale down across multiple regions in the public cloud, on-premises data centers or across hybrid environments without creating operational complexity or increasing the risk of outages.

Distributed database 300 may be deployed in a variety of configurations depending on business requirements, and latency considerations. Some examples are single availability zone (zone/rack/failure domain), multiple availability zones in a region, multiple regions (with synchronous and asynchronous replication choices), etc. An example of such a distributed database is YugaByte DB available from YugaByte, Inc. The components of distributed database 300 are described in detail below.

In one embodiment, the universe of distributed database 300 consists of one or more keyspaces, with each keyspace being a namespace that can contain one or more database tables. Distributed database 300 automatically shards, replicates and load-balances these database tables across the nodes in the universe, while respecting user-intent such as cross-AZ or region placement requirements, desired replication factor, and so on. Distributed database 300 automatically handles failures (e.g., node, availability zone or region failures), and re-distributes and re-replicates data back to desired levels across the remaining available nodes while still respecting any data placement requirements.

Distributed database 300 has two components—Master process and TServer (Tablet Server) process. The Master processes are responsible for keeping system metadata/records, such as what tables exist in the system, where their tablets live, what users/roles exist, the permissions associated with them, etc. Master processes also are responsible for coordinating system-wide operations such as create/alter drop tables and initiating maintenance operations such as load-balancing or initiating re-replication of under-replicated data. The Master process' executing in the different nodes (310A-310B) are not in the critical path of IO against user tables (which is handled by TServer processes as described below).

The TServer processes are responsible for hosting/serving user data (e.g., database tables). Each TServer process does the actual IO for end user requests received from user applications. The user requests may be according to the various protocols supported by distributed database 300. Query Layer, executing as part of each TServer process, implements the server-side of multiple protocols/APIs that distributed database 300 supports such as Apache Cassandra CQL, Redis APIs, Postgres SQL API, etc.

In one embodiment, each database table is split/sharded into one or more tablets based on groups of primary keys. Each tablet is composed of one or more tablet-peers depending on the replication factor, with each TServer process hosting one or more tablet-peers. The manner in which a table having one or more tablets with a replication factor of 3 (that is, 3 peers) may be maintained in nodes 310A-310C is depicted in FIG. 3.

Each TServer process also coordinates operations across tablets hosted by it by using techniques such as per-server block cache (leading to highly efficient memory utilization in cases when one tablet is read more often than others), throttled compactions (to prevent high foreground latencies during a compaction storm), small/large compaction queues to keep the system functional even in extreme IO patterns, per-server memstore limits, auto-sizing of block cache/memstore, striping tablet load uniformly across data disks, etc.

In one embodiment, the Master and TServer processes use Raft, a distributed consensus algorithm, for replicating changes to system metadata or user data respectively across a set of nodes. The detail of the Raft consensus algorithm is available in the paper entitled "In Search of an Understandable Consensus Algorithm (Extended Version)" by Diego Ongaro and John Ousterhout of Stanford University. Specifically, the Master process' executing in the different nodes (310A-310B) forms a Raft group with its peers, while the tablet-peers (e.g. "tablet 1, peer 1", "tablet 1, peer 2", etc.) corresponding to each tablet (e.g. "tablet 1") hosted on different TServers (in nodes 310A-310C) form a corresponding Raft group and replicate data between each other. In addition, according to Raft, one of the peers is selected as a "leader" node at any given duration, with the leader node operating as a point of interface to external applications during that duration.

The Master and TServer processes along with the operation of Raft groups provides for a transactional, high performance distributed database (300) for planet-scale applications. The manner in which orchestration server 150 orchestrates the creation of distributed database 300 is described below with examples.

5. Orchestrating the Creation of a Distributed Database

FIGS. 4A-4D depicts sample user interfaces provided for creation of a distributed database (example data service) in one embodiment. Display areas 400, 430 and 470 represents a respective portion of a user interface displayed on a display unit (not shown) associated with end user system 160. In one embodiment, display area 400/430/470 corresponds to a web page rendered by a browser executing on end user system 160. Web pages are provided by orchestration server 150 in response to a user sending appropriate requests (for example, by specifying corresponding URLs in the address bar) using the browser.

Figure 4A:
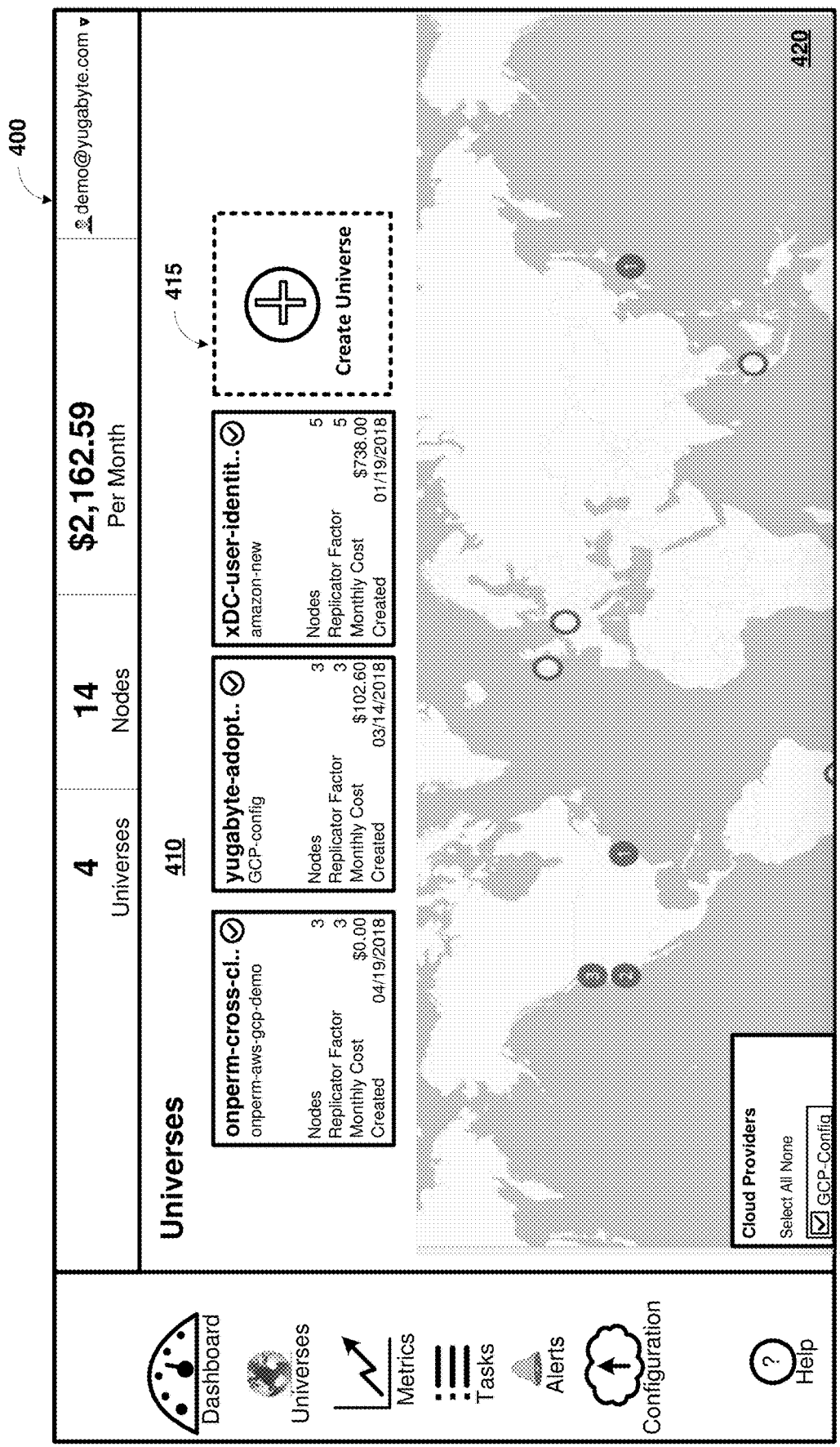

Referring to FIG. 4A, display area 400 depicts a "Dashboard" web page that is displayed in the browser (executing in end user system 160) in response to a user/customer specifying a URL in the browser address bar. Display area 410 depicts the various distributed database universes (clusters) that have been previously been provisioned by the customer. Display area 420 depicts the universes graphically on a world map, with each circle indicating a corresponding region and the number within the circle indicating the corresponding number of zones in which nodes have been provisioned for the customer. The user/customer may click/select display area 415 to indicate creation of a new universe (distributed database).

Figure 4B:
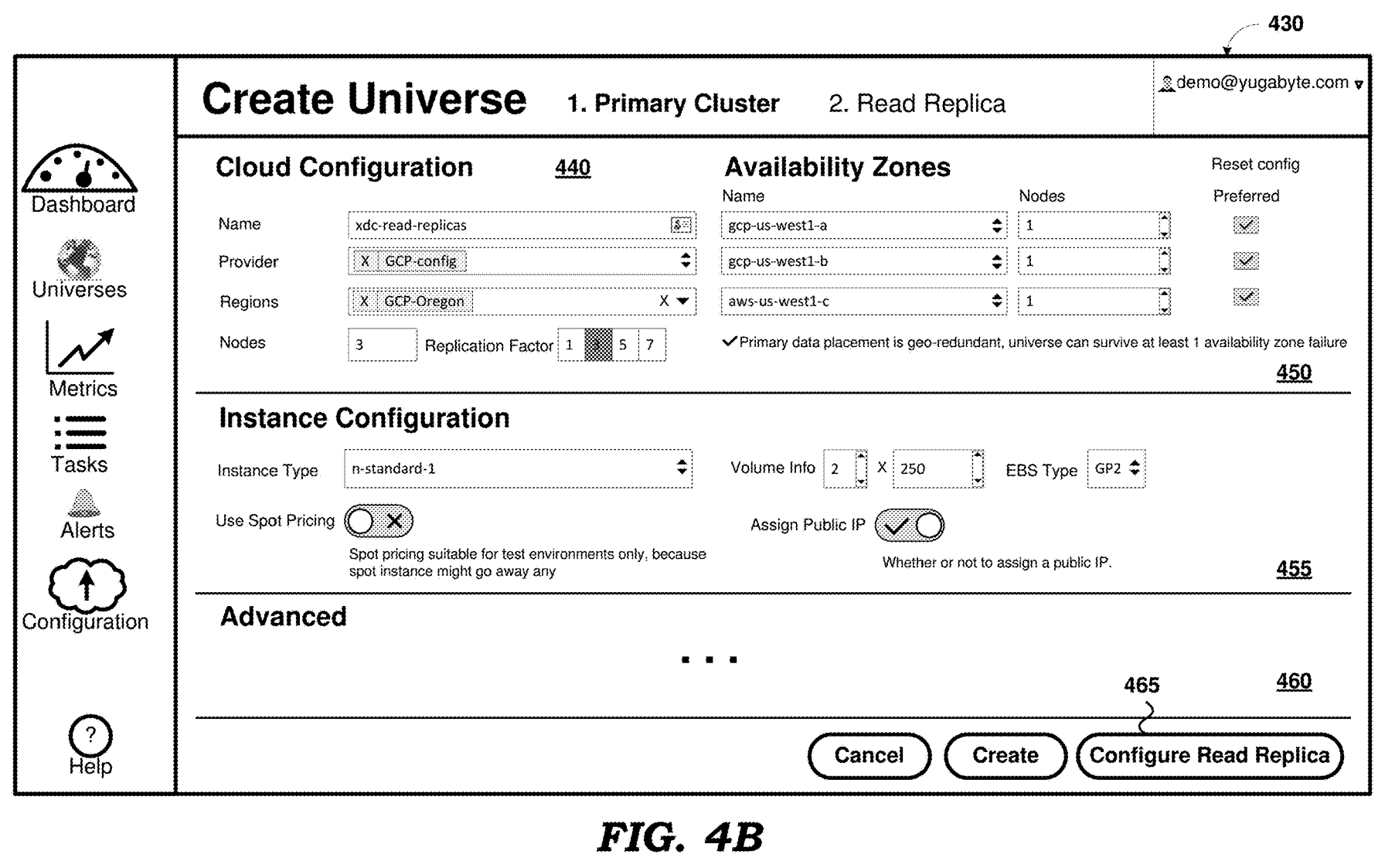

Referring to FIG. 4B, display area 330 depicts a "Create Universe" web page that is displayed in the browser in response to the user/customer clicking/selecting display area 415 in FIG. 4A. Display area 440 facilitates the user/customer to specify a name for the universe/cloud (e.g. "xdc-read-replicas"), the specific provider (e.g. "GCP-config"), the specific regions (e.g. "GCP-Oregon"), the number of nodes (e.g. 3) and the replication factor (e.g. 3).

It may be appreciated that the user/customer may select any desired number and/or combination of desired providers and/or regions and/or nodes in the interface of display area 440. For example, to create a universe in AWS, the user may specify the provider as "AWS-new" and the specific region(s) as "AWS-Oregon".

In response to the user/customer specifying the details in display area 440, orchestration server 150 determines the availability zones in the regions selected in display area 440 and the distribution of the customer specified nodes among the zones and displays the corresponding information in display area 450. In display area 450, the "Preferred" check box has been shown selected for all of the zones gcp-us-west1-a, gcp-us-west1-b, and gcp-us-west1-c indicating that all the three zones are preferred (in other words, there is no specific zone that is more preferred than the others) for the leader nodes.

The user/customer may then specify the desired node distribution (1 node in each zone) among the different zones shown in display area 450 and also the details of the instance to be provisioned (e.g. "n-standard-1") on the nodes in display area 455. The user/customer may also specify one or more advanced options (not shown for conciseness) in display area 460, and then click/select "Configure Read Replica" button 465 to configure the read replication details.

In one embodiment, the read replica is a cluster of nodes that maintains a read-only copy of the data in an asynchronous manner from the nodes in the primary cluster (shown in FIG. 3). Such a read replica may be desirable when the latency of doing a distributed consensus based write among the nodes in the primary cluster is not tolerable for some workloads.

An aspect of the present disclosure facilitates such read replica clusters to be created on a cloud infrastructure different from the cloud infrastructure hosting the nodes of the primary cluster. It should be noted that the different set of nodes on different cloud infrastructures forming the primary cluster and the read replica clusters are both specified using the common user interface of FIGS. 4A-4D.

Figure 4C:
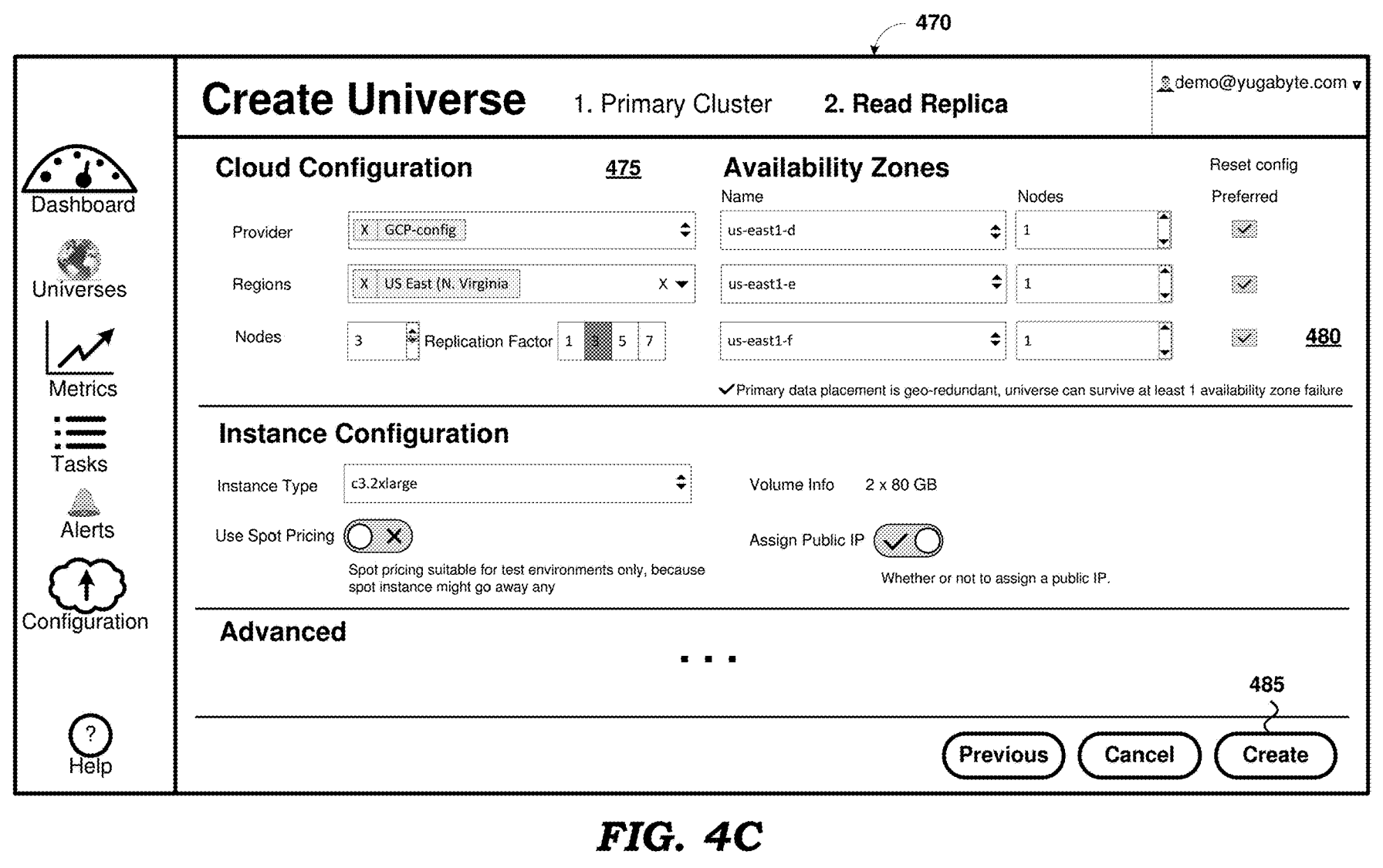

Referring to FIG. 4C, display area 470 depicts a "Create Universe (Read Replica)" web page that is displayed in the browser in response to the user/customer clicking/selecting button 465 in FIG. 4B. The display areas (e.g. 480 and 485) shown in FIG. 4C operate similar to the corresponding display areas (e.g. 440 and 450) of FIG. 4B, and accordingly their description is not repeated here for conciseness. It may be appreciated that the user/customer may select (in display area 480) a combination of providers and/or regions for the read replica different from that selected (in display area 440) for the primary cluster. After specifying the desired details, the user/customer may click/select "Create" button 485 to indicate the creation of the specified universe.

In response to the user/customer selecting button 485 in FIG. 4C, a universe create intent with the user specified details (in the user interfaces of FIGS. 4B and 4C) is received by orchestration server 150. Orchestration server 150 then performs one or more underlying tasks for creating the customer specified universe/distributed database such as provisioning the nodes, configuring the nodes, initiating the Master processes on the nodes, waiting for the Master processes to be alive, initiating the TServer processes on the nodes, and waiting for the TServer processes to be alive.

It may be appreciated that a user/customer can use the same user interface of FIGS. 4B and 4C to create universes in different cloud infrastructures (e.g., AWS, Microsoft Azure™, Kubernetes™, etc.). Transparent to the user, orchestration server 150 again performs the above noted tasks by interfacing with the respective cloud infrastructures 110/120 via provisioning systems 140A-140C.

According to another aspect of the present disclosure, the user/customer is facilitated to create a universe containing nodes spanning multiple cloud infrastructures. Thus, referring to FIG. 4D, display area 440 facilitates the user/customer to specify multiple providers (e.g. "GCP-config" and "AWS-new") and one or more specific regions (e.g. "GCP-Oregon" and "AWS-Oregon") of each provider.

Figure 4D:
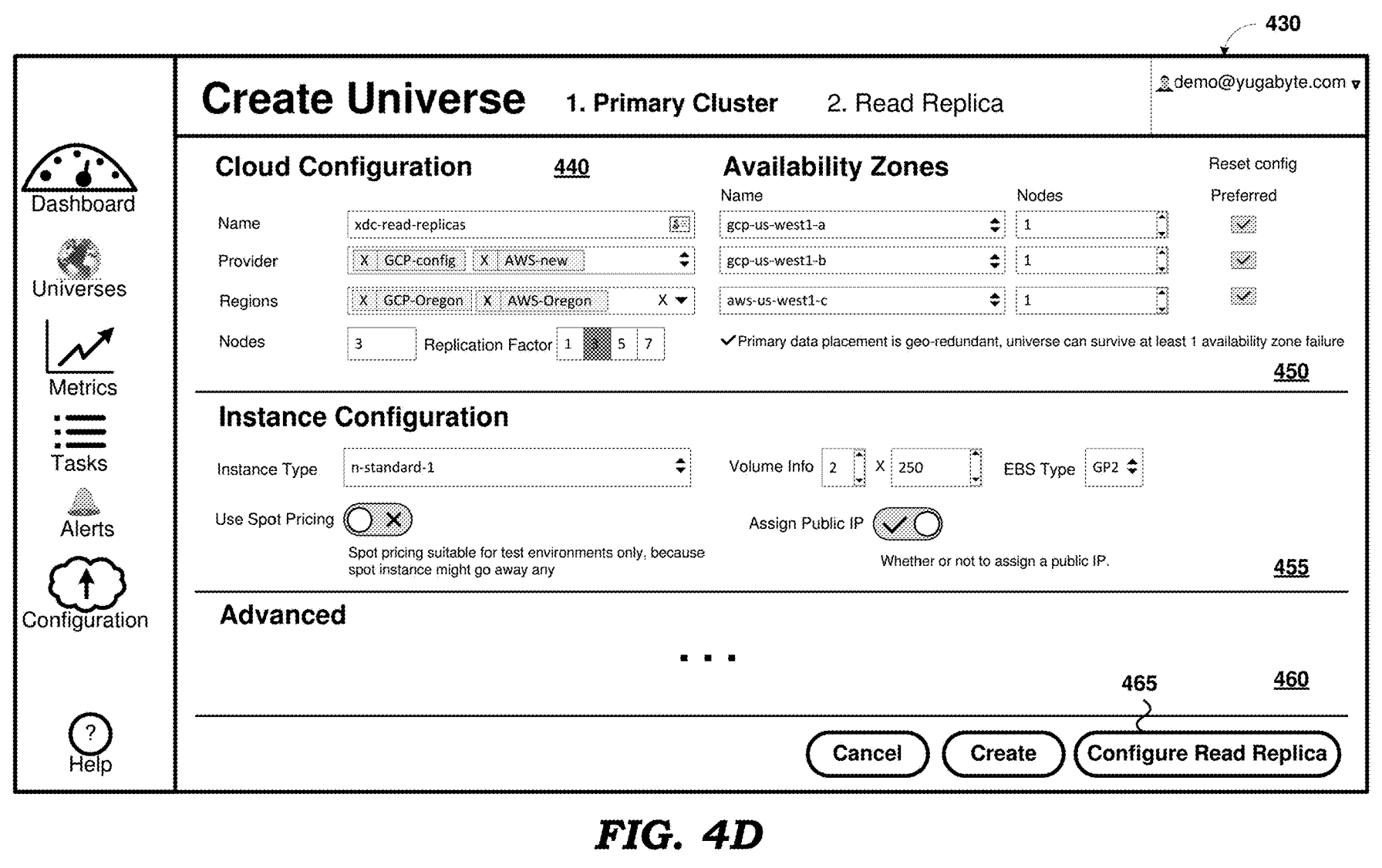

Orchestration server 150 accordingly determines the availability zones in the regions selected from multiple providers. It may be observed that in display area 450, the first two nodes are shown allocated from GCP cloud infrastructure, while the third node is shown allocated from AWS cloud infrastructure. The rest of the user interface elements of FIG. 4D are described similar to corresponding elements of FIG. 4B. The user/customer may then specify the details of a read replica using the interface of FIG. 4C and then select the create button 490.

In response to the user/customer selecting button 490 in FIG. 4C, orchestration server 150 performs the tasks noted above by sending appropriate commands to provisioning systems 140A-140C. Some sample commands sent by orchestration server 150 for creation of a universe/distributed database is described below with examples.

6. Sample Commands for Creation of a Distributed Database

FIGS. 5A and 5B depict example commands issued for creation of a distribution database (example data service) in one embodiment. Command 510 is a provisioning call for a node in the Google Cloud Platform (GCP) infrastructure. Upon receiving of command 510, the underlying cloud implementation (in orchestration server 150) for Google Cloud Platform is invoked, which in turn invokes the GoogleCloudAdmin.create_instance method that causes a Google cloud instance/node to be provisioned. Once the node/instance comes up (is alive) with SSH capabilities, a custom Ansible script is then executed to install necessary software/libraries like ntp, etc. The security of the node is then increased by disabling the default SSH port (22) and enable a custom SSH port (CUSTOM_SSH_PORT) via Ansible scripts. In addition, the cloud implementation also creates a custom database user, setup mount points and installs ntp (for Clock Sync), Prometheus™, Node Exporter™ (for node metrics).

Command 570 (in FIG. 5B) is a provisioning call for a node in the Amazon Web Services (AWS) infrastructure. Upon receiving of command 570, the underlying cloud implementation (in orchestration server 150) for AWS is invoked, which in turn uses an Ansible ec2 API to create the instance/node, and also ec2_vol to create any custom volumes needed. The cloud implementation also performs the other additional actions noted above (for command 510) using custom Ansible scripts.

Command 520 is a configuration call for the newly allocation node/instance in GCP, while command 580 is the corresponding configuration call in AWS. The configuration call is pretty much cloud agnostic. The underlying cloud implementation executes an Ansible role call configure-cluster-server, which performs various actions such as create the database user, copy the distributed database binaries to correct folder, create Master/TServer data folders, create mount points, configure gflags config (for Master and TServer described in FIG. 3), and setup a cron job to monitor Master and TServer processes (to keep the process live).

Command 530 is a call to start the Master process (noted above in FIG. 3) on the nodes (and is common to both GCP and AWS). Specifically, command 530 uses an Ansible role to run a server-ctl.sh script to start Master process on the provisioned nodes. Command 540 is a call to start the TServer process (noted above in FIG. 3) on the nodes (and is common to both GCP and AWS). Command 540 also uses an Ansible role to run server-ctl.sh script to start TServer process on the provisioned nodes.

Similar commands may be sent by orchestration server 150 for provisioning the distributed database in nodes of On-Premises clouds owned by the customers. Alternatively, the nodes may be pre-provisioned, and accordingly orchestration server 150 may skip the sending of commands to such pre-provisioned nodes.

Thus, orchestration server 150 facilitates the creation of a distributed database (possibly spanning diverse cloud infrastructure) in response to receiving a create universe intent from the user/customer. It may accordingly be appreciated that the commands shown in FIGS. 5A and 5B correspond to the create universe intent. Corresponding sets of commands may be sent by orchestration server 150 for effecting other intents also, as will be apparent to a skilled practitioner by reading the disclosure herein. The customer may then view the details of the newly created universe as described below with examples.

7. Monitoring a Provisioned Distributed Database

FIGS. 6A-6E depicts sample user interfaces provided for monitoring the details of a provisioned distributed database (example data service) in one embodiment. Display area 600 represents a portion of a user interface displayed on a display unit (not shown) associated with end user system 160. In one embodiment, display area 600 corresponds to a web page rendered by a browser executing on end user system 160. Web pages are provided by orchestration server 150 in response to a user sending appropriate requests (for example, by specifying corresponding URLs in the address bar) using the browser.

Figure 6A:
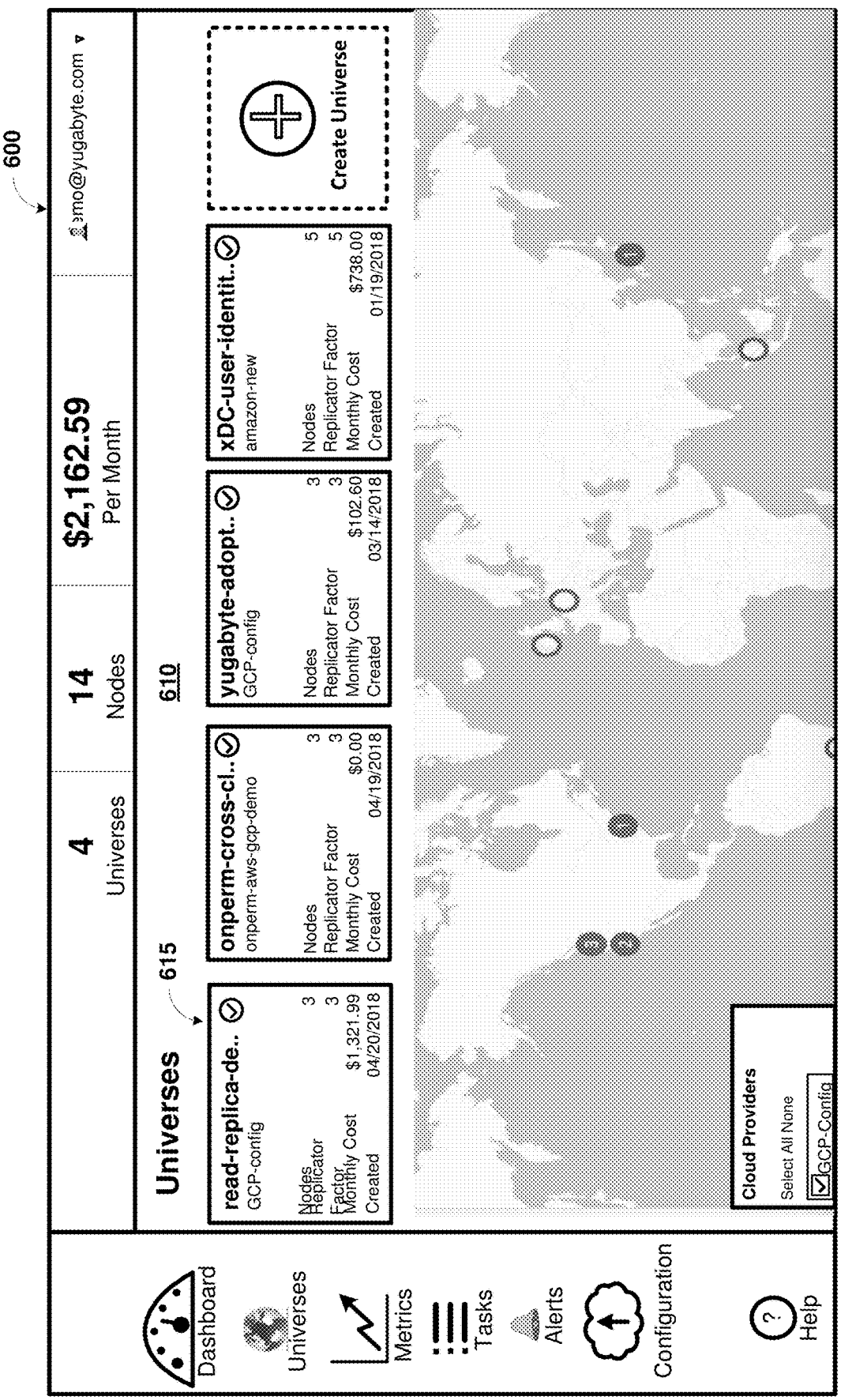

Display area 600 of FIG. 6A, similar to display area 400 of FIG. 4A, displays a "Dashboard" page but with the newly created universe "xdc-read-replicas" (created using the interfaces of FIGS. 4A-4C) shown in display area 610. The user/customer may then click/select display area 615 to view the details of the newly created universe.

Figure 6B:
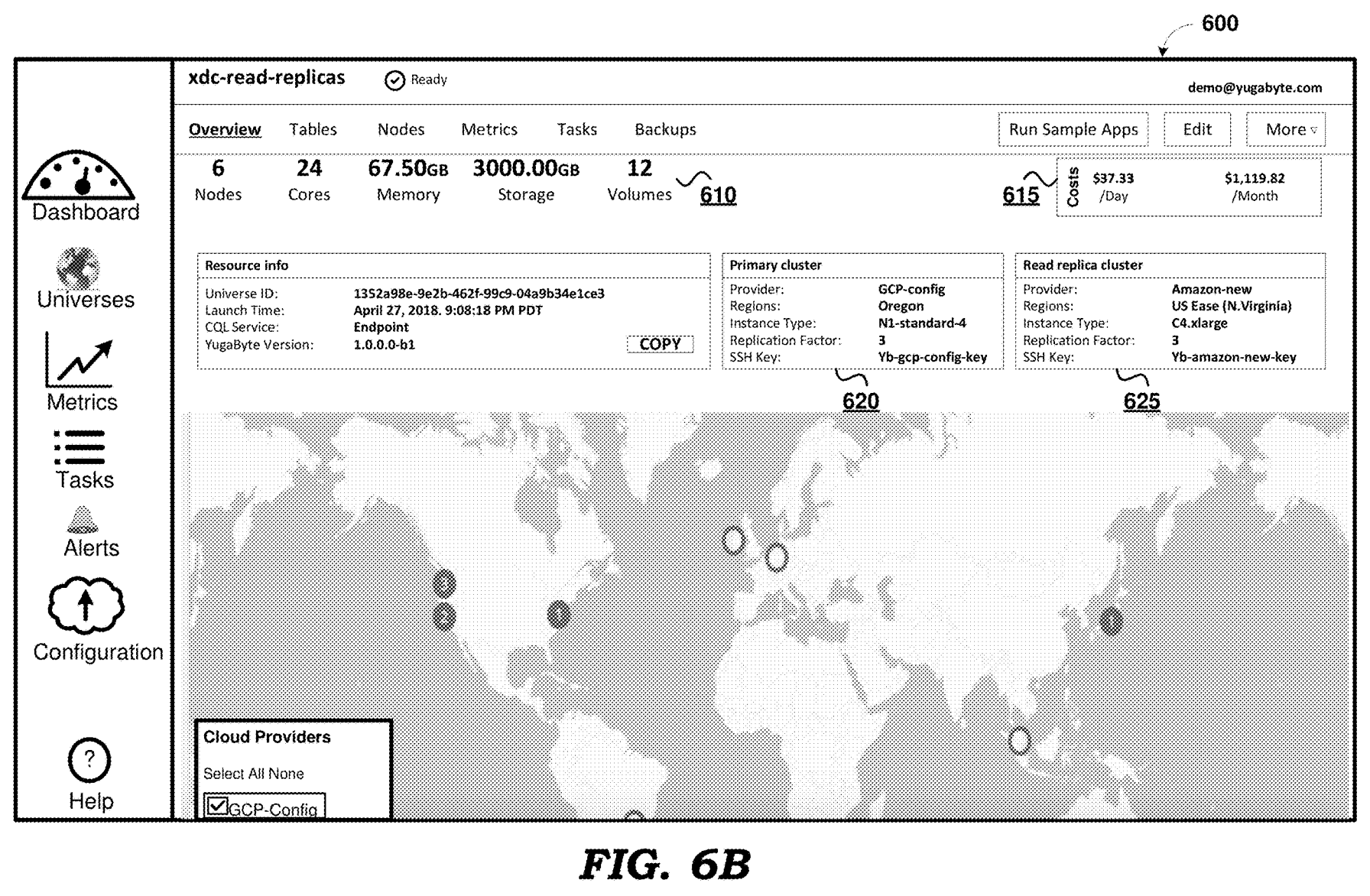

Display area 600 of FIG. 6B accordingly depicts an "Overview" web page that is displayed in the browser (executing in end user system 160) in response to a user/customer selecting the universe named "xdc-read-replicas" by clicking/selecting display area 615 of FIG. 6A. Display area 610 depicts the details of the provisioned nodes such as the number of nodes, the number of CPUs, the total storage, etc., while display area 615 depicts the details of the cost of the provisioned nodes. Display area 620 depicts the details of the primary cluster such as the specific cloud provider (GCP), the region and the zone to which the nodes belong, while display area 625 depict the corresponding details of the read replica cluster.

Figure 6C:
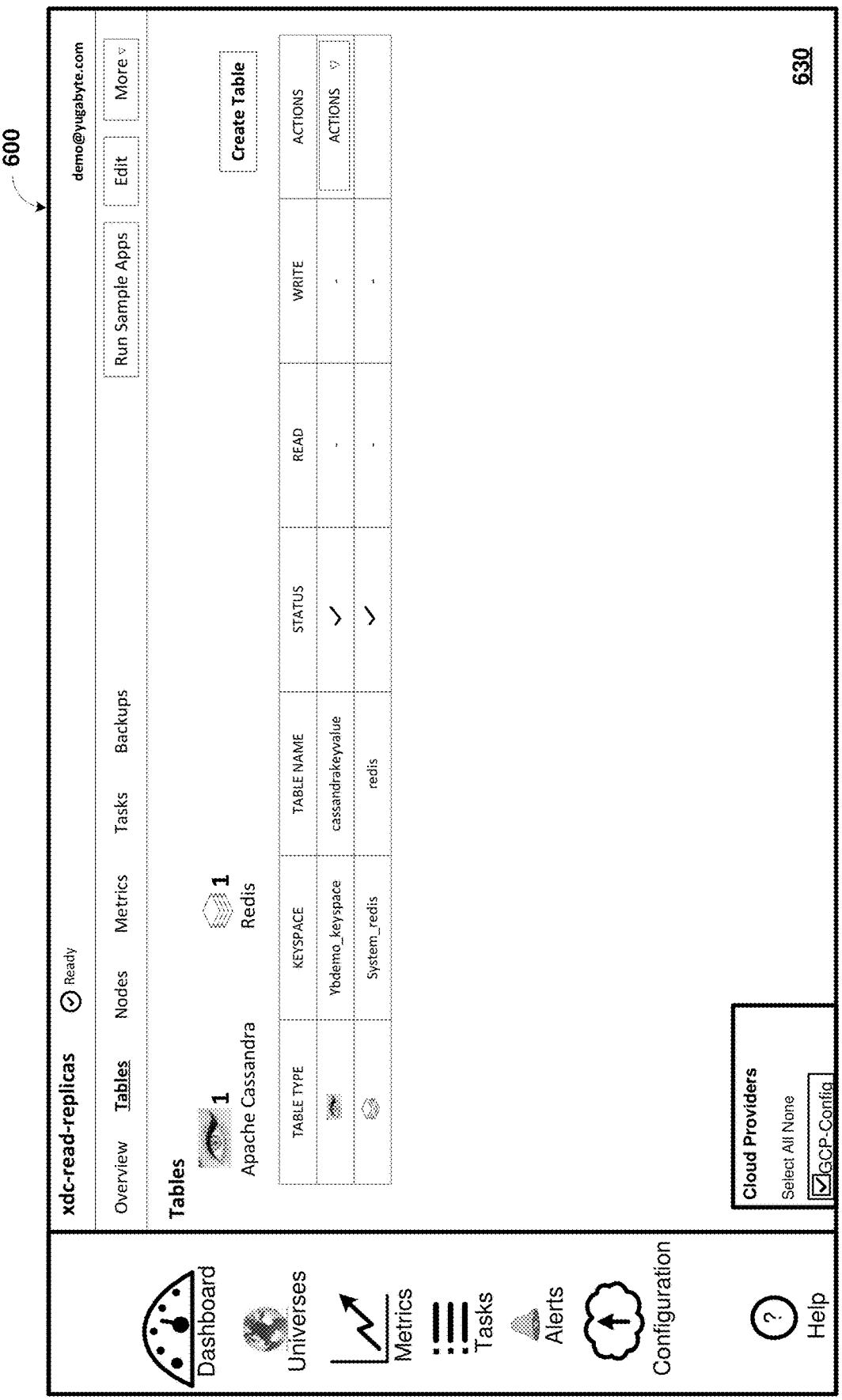
Figure 6E:
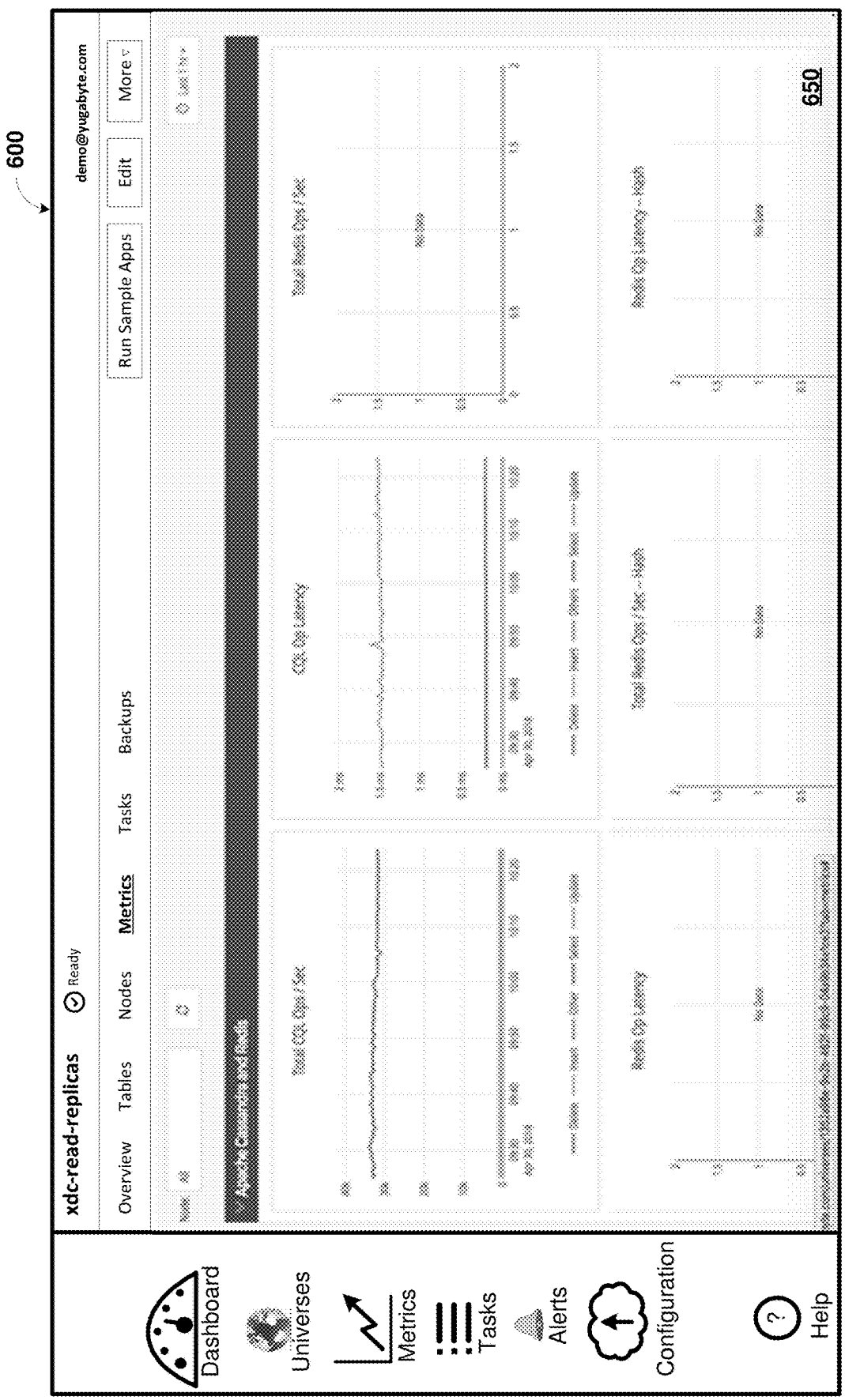

Display areas 600 of FIGS. 6C, 6D and 6E respectively depicts "Tables", "Nodes" and "Metrics" web pages that are displayed in the browser in response to a user/customer selecting the corresponding tab in FIG. 6B. Display area 630 specifies the details of the tables that are hosted on the distributed database. Display area 640 specifies the details of the nodes that are provisioned as part of the universe. Display area 650 depicts various metrics associated with the provisioned nodes.

Thus, a user/customer is facilitated to view the details of a previously provisioned distributed database. The manner in which orchestration server 150 is implemented in one embodiment is described below with examples.

8. Orchestration Server

According to an aspect of the present disclosure, orchestration server 150 provides an infrastructure independent control plane for orchestration of data services such as distributed databases in multiple cloud infrastructures. In other words, orchestration server 150 abstracts away the underlying infrastructure whether it be VMs/containers/bare-metal deployments in a public or private cloud environment, and makes install/admin/orchestration operations of distributed databases similar in each of these environments. Once configured, the steps to create a distributed database deployment or make changes to the deployment (such as expanding size of the distributed database cluster, change replication factor, perform software upgrades, or migrate deployment from one kind of hardware to another etc.) are identical.

In one embodiment, an admin console application (described below) executing in orchestration server 150 provides the control plane for installing, managing and orchestrating several aspects of the distributed databases. An example of such an admin console application is the YugaWare application available from YugaByte, Inc.

Figure 7:
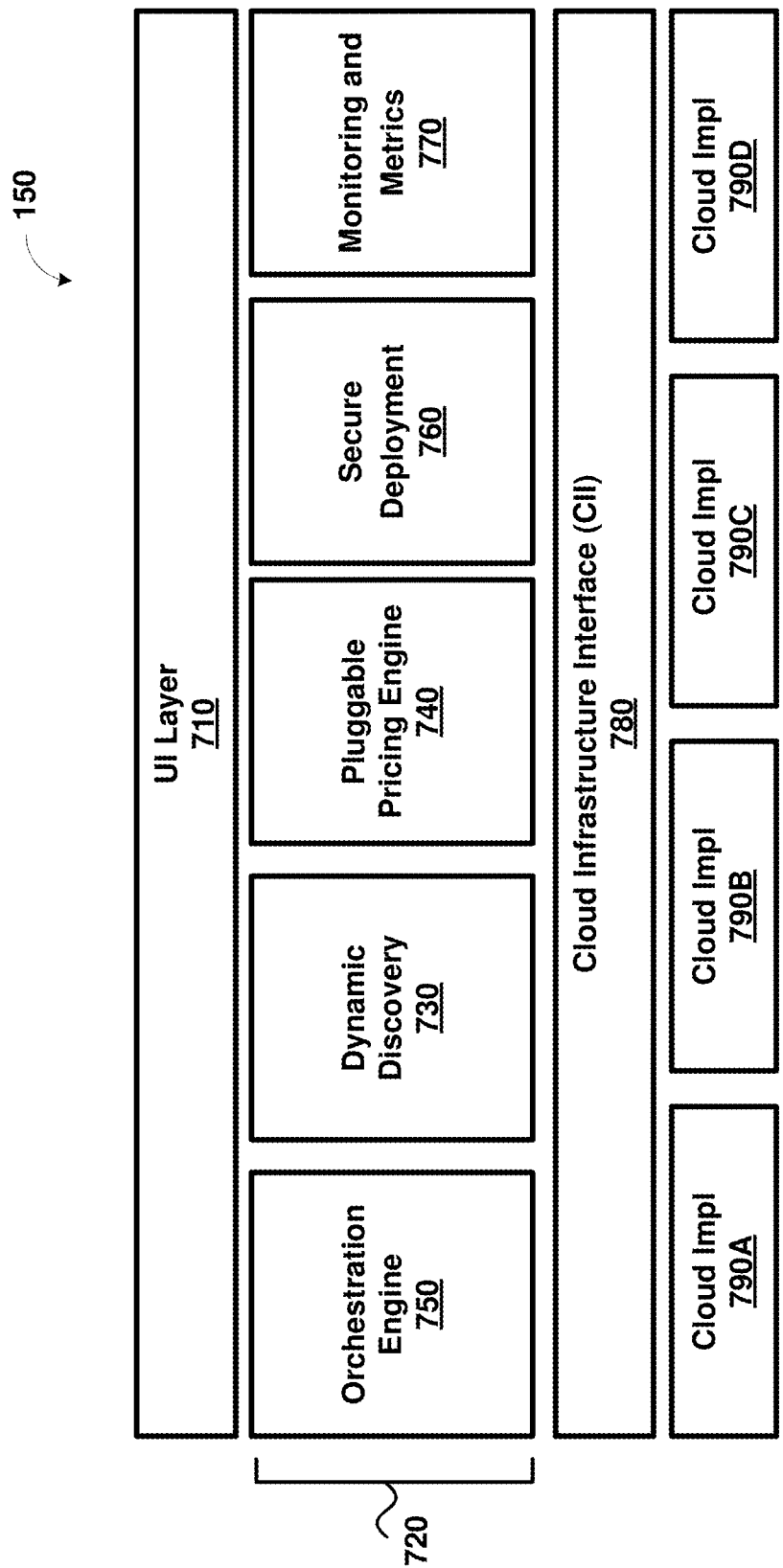
FIG. 7 is a block diagram illustrating an example implementation of an infrastructure independent control plane (admin console application) provided in an orchestration server in one embodiment.

FIG. 7 is a block diagram illustrating an example implementation of an infrastructure independent control plane (admin console application) provided in an orchestration server in one embodiment. The block diagram is shown containing user interface (UI) layer 710, application programming interface (API) layer 720, cloud infrastructure interface (CII) 780 and cloud implementations 790A-790D. API layer 720 in turn is shown containing orchestration engine 750, dynamic discovery 730, pluggable pricing engine 740, secure deployment 760, monitoring and metrics 770.

Merely for illustration, only representative number/type of blocks is shown in the FIG. 7. In addition, the blocks are shown executing in orchestration server 150. Many environments often contain many more blocks, both in number and type, with some of the blocks executing in other systems/servers, depending on the purpose for which the environment is designed. Each block of FIG. 7 is described below in further detail.

UI layer 710 receives user requests from (users/customers using) end user system 160 and sends appropriate web pages as corresponding responses to the user requests. UI layer 710 also receives inputs provided by the users in the provided web pages and invokes the corresponding modules in API layer 720. In one embodiment, UI layer 710 is implemented using React JS.

API layer 720 contains one or more modules implementing corresponding functionalities provided by the control plane. For example, orchestration engine 750 facilitates the orchestration of a distributed database spanning diverse cloud infrastructures. Dynamic discovery 730 facilitates discovery of new nodes based on configuration such that the provisioning of an application/service can be modified without affecting other applications/services. Pluggable pricing engine 740 facilitates users/customers to view the approximate costs of provisioning of a distributed database including what-if scenarios.

Secure deployment 760 facilitates the secured provisioning/deployment of the distributed databases including features such as network isolation, encryption, access control, etc. Monitoring and metrics 770 facilitates users/customers to monitor various metrics such as CPU usage, memory usage, requests processed, etc. associated with the virtual/physical nodes on which a distributed database has been provisioned. In one embodiment, the modules of API layer 720 are implemented in Java™ programming language.

According to an aspect of the present disclosure, the admin console application makes orchestration tasks intent based, and greatly simplifies operational complexity. These intents can be specified via UI layer 710. In other words, the user/customer using UI layer 710 specifies the intent of the orchestration, with the modules in API layer 720 then performing various underlying tasks associated with the intent without requiring the user/customer to either specify or be aware of the underlying tasks.

Examples of such intents covering the entire life-cycle of a distributed database include, but are not limited to, creation of a distributed database (described above), expanding/shrinking the distributed database based on demand, deploy data across fault domains (multi-zone, multi-region, multi-cloud configurations), zero downtime database software upgrade, zero downtime migrations of a deployment: from one hardware type to another; from one cloud provider to another, stretching a deployment from one cloud to another cloud, dynamically adding multiple read replicas or removing some read replicas.

In an embodiment, the implementations of each of such intents are invocable by corresponding calls of an API, e.g., via a REST API. Such a feature can be the basis for implementing automation of various tasks associated with distributed databases. For example, an automated script can be implemented by appropriate calls to the API to expand the number of nodes in the database universe during expected peak usage durations and to shrink (reduce the number of nodes in) the database universe during non-peak usage durations.

CII 780 provides a cloud agnostic interface to the modules in API layer 720, such that the modules are facilitated to be implemented without having any cloud specific details. Each of cloud implementations 790A-790D represents a corresponding module that is specific to a cloud infrastructure such as AWS, GCP, Kubernetes, On-Premises, etc. CII 780 in association with cloud implementations 790A-790D together operate to convert high-level tasks invoked from API layer 720 to the corresponding actual set of commands specific to the cloud infrastructure, as will be apparent to one skilled in the relevant arts. For example, CII 780 converts the create universe intent into the commands described above with respect to FIGS. 5A and 5B. In one embodiment, CII 780 and cloud implementations 790A-790D (or portions thereof) are implemented in Python™ programming language.

Thus, orchestration server 150 implements an infrastructure independent control plane that facilitates several features of the present disclosure.

It should be appreciated that the features described above can be implemented in various embodiments as a desired combination of one or more of hardware, software, and firmware. The description is continued with respect to an embodiment in which various features are operative when the software instructions described above are executed.

9. Digital Processing System

Figure 8:
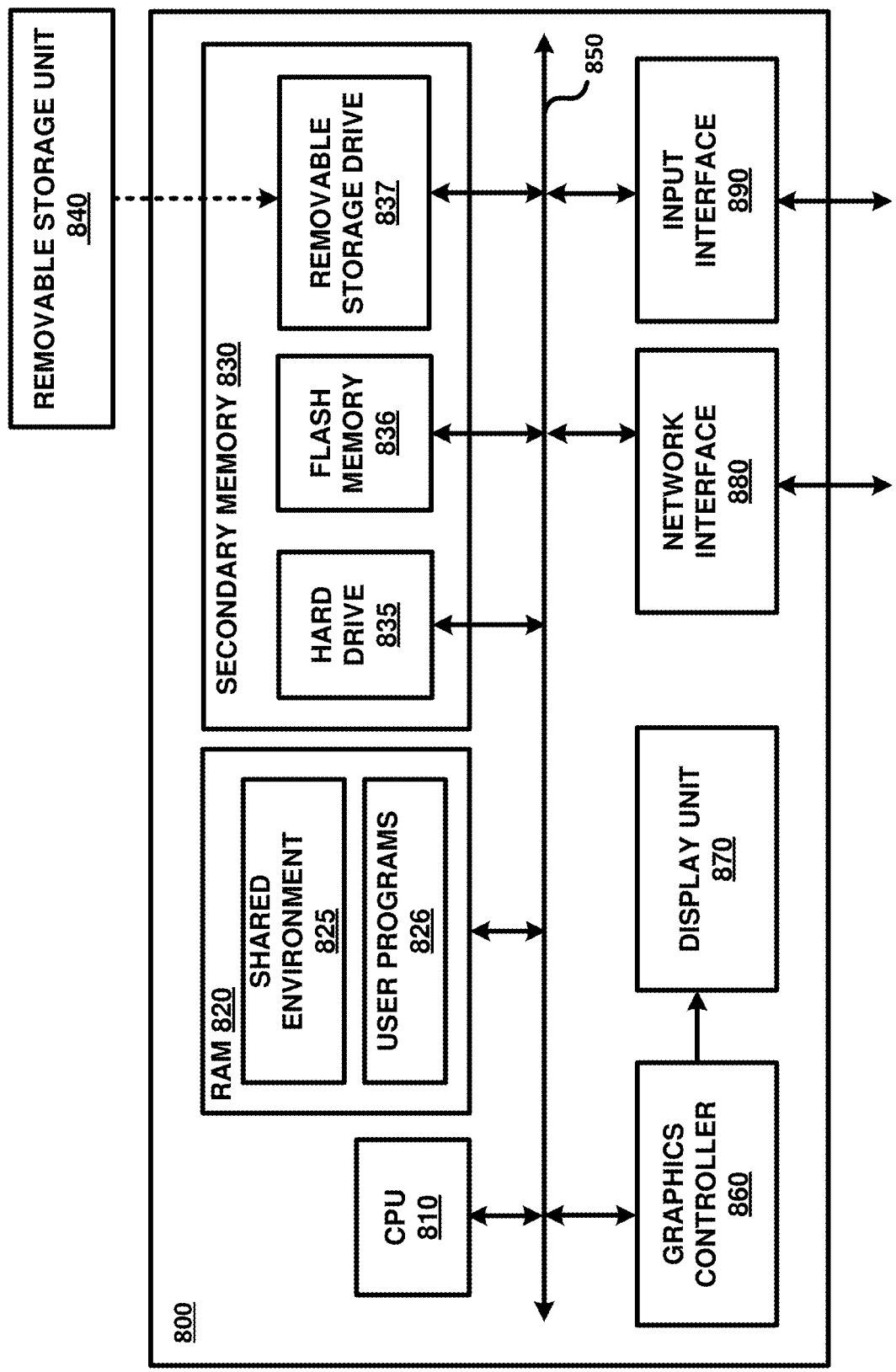
FIG. 8 is a block diagram illustrating the details of a digital processing system in which various aspects of the present disclosure are operative by execution of appropriate executable modules.

FIG. 8 is a block diagram illustrating the details of digital processing system 800 in which various aspects of the present disclosure are operative by execution of appropriate executable modules. Digital processing system 800 may correspond to each of orchestration server 150 and end user system 160.

Digital processing system 800 may contain one or more processors such as a central processing unit (CPU) 810, random access memory (RAM) 820, secondary memory 830, graphics controller 860, display unit 870, network interface 880, and input interface 890. All the components except display unit 870 may communicate with each other over communication path 850, which may contain several buses as is well known in the relevant arts. The components of FIG. 8 are described below in further detail.

CPU 810 may execute instructions stored in RAM 820 to provide several features of the present disclosure. CPU 810 may contain multiple processing units, with each processing unit potentially being designed for a specific task. Alternatively, CPU 810 may contain only a single general-purpose processing unit.

RAM 820 may receive instructions from secondary memory 830 using communication path 850. RAM 820 is shown currently containing software instructions constituting shared environment 825 and/or other user programs 826 (such as other applications, DBMS, etc.). In addition to shared environment 825, RAM 820 may contain other software programs such as device drivers, virtual machines, etc., which provide a (common) run time environment for execution of other/user programs.

Graphics controller 860 generates display signals (e.g., in RGB format) to display unit 870 based on data/instructions received from CPU 810. Display unit 870 contains a display screen to display the images defined by the display signals (for example, the portions of the user interfaces shown in FIGS. 4A-4D, 6A-6E and FIGS. 7A-7B). Input interface 890 may correspond to a keyboard and a pointing device (e.g., touch-pad, mouse) and may be used to provide inputs (for example, the user inputs provided in the above noted user interfaces). Network interface 880 provides connectivity to a network (e.g., using Internet Protocol), and may be used to communicate with other systems (of FIG. 1) connected to the network (130).

Secondary memory 830 may contain hard drive 835, flash memory 836, and removable storage drive 837. Secondary memory 830 may store the data (for example, data/commands of FIGS. 5A and 5B, FIG. 7C, etc.) and software instructions (for example, for implementing the various features of the present disclosure, etc.), which enable digital processing system 800 to provide several features in accordance with the present disclosure. The code/instructions stored in secondary memory 830 may either be copied to RAM 820 prior to execution by CPU 810 for higher execution speeds, or may be directly executed by CPU 810.

Some or all of the data and instructions may be provided on removable storage unit 840, and the data and instructions may be read and provided by removable storage drive 837 to CPU 810. Removable storage unit 840 may be implemented using medium and storage format compatible with removable storage drive 837 such that removable storage drive 837 can read the data and instructions. Thus, removable storage unit 840 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 840 or hard disk installed in hard drive 835. These computer program products are means for providing software to digital processing system 800. CPU 810 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 830. Volatile media includes dynamic memory, such as RAM 820. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 850. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

10. Conclusion

While various embodiments of the present disclosure have been described above, it should be understood that they have been presented by way of example only, and not limitation. Thus, the breadth and scope of the present disclosure should not be limited by any of the above-described exemplary embodiments.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

What is claimed is:

1. A computing system comprising:
a first cloud infrastructure and a first provisioning server, said first provisioning server being operable to provision nodes of said first cloud infrastructure in response to receiving of commands according to a first syntax/semantics;
a second cloud infrastructure and a second provisioning server, said second provisioning server being operable to provision nodes of said second cloud infrastructure in response to receiving of commands according to a second syntax/semantics; and
an orchestration server to provide a common user interface to a user, wherein said user is facilitated to provision a first cloud containing both of a first set of nodes in said first cloud infrastructure and a second set of nodes in said second cloud infrastructure via said common user interface,
wherein said orchestration server issues a first set of commands to said first provisioning server and a second set of commands to said second provisioning server to provision said first cloud to contain both of said first set of nodes and said second set of nodes,
wherein said first set of commands is according to said first syntax/semantics to provision said first set of nodes in said first cloud infrastructure, and
wherein said second set of commands is according to said second syntax/semantics to provision said second set of nodes in said second cloud infrastructure,
wherein upon completion of said provisioning, said first set of nodes and said second set of nodes together operate as part of said first cloud spanning said first cloud infrastructure and said second cloud infrastructure,
wherein said first set of nodes and said second set of nodes of said first cloud operate to provide a distributed database,
wherein said first set of nodes and said second set of nodes form a primary cluster of said distributed database, said primary cluster being responsible for processing all client requests directed to said distributed database,
wherein said common user interface facilitates said user to provision a third set of nodes spanning said first cloud infrastructure and said second cloud infrastructure, said third set of nodes forming a read replica for said distributed database,
wherein said orchestration server issues a third set of commands to said first provisioning server and said second provisioning server to provision said third set of nodes,
wherein each of said first provisioning server, said second provisioning server and said orchestration server contains at least one corresponding processor and at least one corresponding memory.

2. The computing system of claim 1, wherein said common user interface includes a first field and a third field to specify an identity of respective cloud infrastructure, and a second field and a fourth field to specify a corresponding number of nodes,
wherein the user specifies the identity of said first cloud infrastructure in said first field and a first count in said second field to cause provisioning of said first count of nodes as said first set of nodes in said first cloud infrastructure,
wherein the user thereafter specifies the identity of said second cloud infrastructure in said third field and a second count in said fourth field to cause provisioning of said second count of nodes as said second set of nodes in said second cloud infrastructure.

3. The computing system of claim 1, wherein said common user interface facilitates said user to specify an intent of an orchestration task to be performed with respect to the nodes of said first cloud,
wherein said orchestration server sends commands corresponding to said intent to cause performance of said orchestration task with respect to the nodes of said first cloud.

4. The computing system of claim 3, wherein said intent comprises each of creation of said first cloud, expanding said first cloud by adding additional nodes, shrinking said first cloud by removing provisioned nodes, update of software components deployed on the nodes in said first cloud, migration of software components and data from one node to another node in said first cloud infrastructure and said second cloud infrastructure.

5. The computing system of claim 1, wherein said orchestration server issues additional commands directly to said first set of nodes and said second set of nodes to install software components on each node such that the nodes together operate as said distributed database.

6. The computing system of claim 5, wherein said distributed database stores a plurality of tables with each table comprising a corresponding set of tablets,
wherein said software components comprise a master process and a tablet server process,
wherein said master processes of the nodes together operate to distribute tablets among the nodes and also to specify the nodes where each tablet is to be replicated, wherein said tablet server process of each node maintains a corresponding set of tablets and processes client requests directed to said plurality of tables by determining the specific tablets required for processing the client request and forwarding the client request to the specific node responsible for performing operations on the determined specific tablets.

7. A method comprising:

providing a common user interface for provisioning nodes in different cloud infrastructures;

receiving via said common user interface, input data requesting provisioning of a first cloud containing both of a first set of nodes in a first cloud infrastructure and a second set of nodes in a second cloud infrastructure; and sending a first set of commands according to a first syntax/semantics to a first provisioning server and a second set of commands according to a second syntax/semantics to a second provisioning server, wherein said first provisioning server provisions said first set of nodes in said first cloud infrastructure in response to receiving of said first set of commands and said second provisioning server provisions said second set of nodes in said second cloud infrastructure in response to receiving of said second set of commands, wherein upon completion of said provisioning, said first set of nodes and said second set of nodes together operate as part of said first cloud spanning said first cloud infrastructure and said second cloud infrastructure, wherein said first set of nodes and said second set of nodes of said first cloud operate to provide a distributed database, wherein said first set of nodes and said second set of nodes form a primary cluster of said distributed database, said primary cluster being responsible for processing all client requests directed to said distributed database, wherein said common user interface facilitates said user to provision a third set of nodes spanning said first cloud infrastructure and said second cloud infrastructure, said third set of nodes forming a read replica for said distributed database, wherein said orchestration server issues a third set of commands to said first provisioning server and said second provisioning server to provision said third set of nodes.

8. The method of claim 7, wherein said common user interface includes a first field and a third field to specify an identity of respective cloud infrastructure, and a second field and a fourth field to specify a corresponding number of nodes, wherein the user specifies the identity of said first cloud infrastructure in said first field and a first count in said second field to cause provisioning of said first count of nodes as said first set of nodes in said first cloud infrastructure, wherein the user thereafter specifies the identity of said second cloud infrastructure in said third field and a second count in said fourth field to cause provisioning of said second count of nodes as said second set of nodes in said second cloud infrastructure.

9. The method of claim 7, further comprising:

receiving, via said common user interface, an intent of an orchestration task to be performed with respect to the nodes of said first cloud; and sending commands corresponding to said intent to cause performance of said orchestration task with respect to the nodes of said first cloud.

10. The method of claim 9, wherein said intent comprises each of creation of said first cloud, expanding said first cloud by adding additional nodes, shrinking said first cloud by removing provisioned nodes, update of software components deployed on the nodes in said first cloud, migration of software components and data from one node to another node in said first cloud infrastructure and said second cloud infrastructure.

11. The method of claim 7, wherein said common user interface includes a first field and a third field to specify an identity of respective cloud infrastructure, and a second field and a fourth field to specify a corresponding number of nodes, wherein the user specifies the identity of said first cloud infrastructure in said first field and a first count in said second field to cause provisioning of said first count of nodes as said first set of nodes in said first cloud infrastructure, wherein the user thereafter specifies the identity of said second cloud infrastructure in said third field and a second count in said fourth field to cause provisioning of said second count of nodes as said second set of nodes in said second cloud infrastructure.

12. The method of claim 7, further comprising issuing additional commands, by said orchestration server, directly to said first set of nodes and said second set of nodes to install software components on each node such that the nodes together operate as said distributed database.

13. The method of claim 12, wherein said distributed database stores a plurality of tables with each table comprising a corresponding set of tablets, wherein said software components comprise a master process and a tablet server process, wherein said master processes of the nodes together operate to distribute tablets among the nodes and also to specify the nodes where each tablet is to be replicated, wherein said tablet server process of each node maintains a corresponding set of tablets and processes client requests directed to said plurality of tables by determining the specific tablets required for processing the client request and forwarding the client request to the specific node responsible for performing operations on the determined specific tablets.

14. A non-transitory machine readable medium storing one or more sequences of instructions, wherein execution of said one or more instructions by one or more processors contained in an orchestration server causes said orchestration server to perform the actions of:

providing a common user interface for provisioning nodes in different cloud infrastructures, said common user interface including a first field and a third field to specify an identity of a respective cloud infrastructure, and a second field and a fourth field to specify a corresponding number of nodes to be provisioned;

receiving via said common user interface at a first time instance, an identity of a first cloud infrastructure in said first field, a first count in said second field, an identity of a second cloud infrastructure in said third field and a second count in said fourth field;

sending a first set of commands according to a first syntax/semantics to a first provisioning server, wherein said first provisioning server provisions said first set of nodes in said first cloud infrastructure in response to receiving of said first set of commands;

sending a second set of commands according to a second syntax/semantics to a second provisioning server, wherein said second provisioning server provisions said second set of nodes in said second cloud infrastructure in response to receiving of said second set of commands, wherein upon completion of said provisioning, said first set of nodes and said second set of nodes together operate as part of a first cloud spanning said first cloud infrastructure and said second cloud infrastructure, wherein said first set of nodes and said second set of nodes of said first cloud operate to provide a distributed database, wherein said first set of nodes and said second set of nodes form a primary cluster of said distributed database, said primary cluster being responsible for processing all client requests directed to said distributed database, wherein said common user interface facilitates said user to provision a third set of nodes spanning said first cloud infrastructure and said second cloud infrastructure, said third set of nodes forming a read replica for said distributed database; and issuing a third set of commands to said first provisioning server and said second provisioning server to provision said third set of nodes.

15. The non-transitory machine readable medium of claim 14, further comprising one or more instructions for:

receiving, via said common user interface, an intent of an orchestration task to be performed with respect to the nodes of said first cloud; and sending commands corresponding to said intent to cause performance of said orchestration task with respect to the nodes of said first cloud.

16. The non-transitory machine readable medium of claim 15, wherein said intent comprises each of creation of said first cloud, expanding said first cloud by adding additional nodes, shrinking said first cloud by removing provisioned nodes, update of software components deployed on the nodes in said first cloud, migration of software components and data from one node to another node in said first cloud infrastructure and said second cloud infrastructure.

17. The non-transitory machine readable medium of claim 14, wherein said common user interface includes a first field and a third field to specify an identity of respective cloud infrastructure, and a second field and a fourth field to specify a corresponding number of nodes, wherein the user specifies the identity of said first cloud infrastructure in said first field and a first count in said second field to cause provisioning of said first count of nodes as said first set of nodes in said first cloud infrastructure, wherein the user thereafter specifies the identity of said second cloud infrastructure in said third field and a second count in said fourth field to cause provisioning of said second count of nodes as said second set of nodes in said second cloud infrastructure.

18. The non-transitory machine readable medium of claim 14, further comprising one or more instructions for issuing additional commands directly to said first set of nodes and said second set of nodes to install software components on each node such that the nodes together operate as said distributed database.

19. The non-transitory machine readable medium of claim 18, wherein said distributed database stores a plurality of tables with each table comprising a corresponding set of tablets, wherein said software components comprise a master process and a tablet server process, wherein said master processes of the nodes together operate to distribute tablets among the nodes and also to specify the nodes where each tablet is to be replicated, wherein said tablet server process of each node maintains a corresponding set of tablets and processes client requests directed to said plurality of tables by determining the specific tablets required for processing the client request and forwarding the client request to the specific node responsible for performing operations on the determined specific tablets.

\* \* \* \* \*